US006531536B2

(12) United States Patent
Shen

(10) Patent No.: US 6,531,536 B2
(45) Date of Patent: Mar. 11, 2003

(54) ISOCYANATE COMPOSITIONS CONTAINING D-LIMONENE

(75) Inventor: Chin-Chang Shen, Rochester, MI (US)

(73) Assignee: Huntsman International LLC, Salt Lake City, UT (US)

( * ) Notice: Subject to any disclaimer, the term of this patent is extended or adjusted under 35 U.S.C. 154(b) by 0 days.

(21) Appl. No.: 09/765,771

(22) Filed: Jan. 19, 2001

(65) Prior Publication Data

US 2002/0010250 A1 Jan. 24, 2002

Related U.S. Application Data

(60) Provisional application No. 60/177,302, filed on Jan. 21, 2000.

(51) Int. Cl.[7] ............................. C08J 3/00; C08K 3/20; C08K 5/01; C08L 75/00
(52) U.S. Cl. ....................... 524/483; 524/589; 524/590; 524/591; 524/839; 524/840
(58) Field of Search ................. 524/589, 590, 524/591, 839, 840, 483

(56) References Cited

U.S. PATENT DOCUMENTS

| | | | |
|---|---|---|---|
| 3,132,115 A | 5/1964 | Pschorr et al. | 260/29.8 |
| 4,533,598 A | 8/1985 | Downey et al. | 428/380 |
| 5,436,276 A | 7/1995 | Beck | 521/155 |
| 5,506,301 A | 4/1996 | Marques | 524/591 |

*Primary Examiner*—Patrick D. Niland
(74) *Attorney, Agent, or Firm*—Nicole Peffer

(57) ABSTRACT

The invention relates to polyisocyanates and/or polyisocyanate-reactive materials containing at least some d-limonene. The invention further relates to emulsifiable polyisocyanates containing at least some d-limonene. The polyisocyanates and/or polyisocyanate-reactive materials containing d-limonene can be used as a coating material. The obtained coating material comprises a polyisocyanate-derived polymer containing d-limonene.

14 Claims, No Drawings

ISOCYANATE COMPOSITIONS CONTAINING D-LIMONENE

This application claims the benefit of United States Provisional Application Ser. No. 60/177,302 filed on Jan. 21, 2000, entitled Emulsifiable Isocyanate Compositions Containing D-limonene, the subject matter of which is herein incorporated by reference.

FIELD OF THE INVENTION

This invention relates to polyisocyanates which contain at least some d-limonene as an additive.

BACKGROUND OF THE INVENTION

The use of isocyanate-based coatings, and particularly emulsifiable and emulsified isocyanate coatings are known. In the case of isocyanate-reactive coatings, water presents a problem in that the isocyanate groups react with water. The prior art has suggested the use of emulsifiable adducts which are the reaction products of polyisocyanates and hydroxy functional polyethers, to overcome the problem. These adducts have isocyanate functionality to assist in crosslinking of the water based coating and sufficient hydrophilic character to keep the water based coating composition dispersed in an aqueous medium. These adducts, however, tend to react with water to form urea reaction products which reduce the working life of the emulsifiable polyisocyanate. Moreover, exposure of these emulsifiable polyisocyanates to heat can form undesirable polyureas which greatly reduces the pot life of the emulsifiable polyisocyanate.

A further problem with certain prior art coatings, when used to coat, for example, concrete forms, is the tendency of such coatings to bubble. Most concrete surfaces are not smooth, but rather porous and rough. This porosity and surface roughness is typically referred to as "bug holes" or "void pockets". The bubbling of prior art coatings is typically most pronounced at the "bug holes" or "void pockets". A need exists for a coating with a suitable working life, which additionally reduces or eliminates bubbling.

SUMMARY OF THE INVENTION

The invention relates to polyisocyanates which employ at least some d-limonene as an additive. It has been surprisingly found that the addition of a small amount of d-limonene to the polyisocyanate results in a coating material with little or no bubbling when applied to a surface. The d-limonene is added to the polyisocyanate, for example by simple hand-mixing, in an effective amount to reduce bubbling in the coating. After d-limonene addition, the polyisocyanate can be combined with a suitable polyisocyanate-reactive composition, for example a polyol, to form the coating mixture. In an aspect of the invention, the d-limonene can be added to the polyisocyanate-reactive composition, rather than adding it to the polyisocyanate. Moreover, d-limonene can be added to both the polyisocyanate and the polyisocyanate-reactive component. Typically, the polyisocyanate is mixed with the polyisocyanate-reactive composition in a 50:50 by weight ratio. In an aspect of the invention, the polyisocyanate is an emulsifiable polyisocyanate which is subsequently emulsified. In an aspect of the invention an emulsifiable polyisocyanate that includes an isocyanate, a polyisocyanate derived adduct, and d-limonene is used as a coating material. The adducts are the reaction products of a urethane prepolymer and a capping agent, and contains no residual free —NCO groups. The capping agent is any of methoxypolyoxyethylene monols, polyoxyethylene-polyoxypropylene monols, and mixtures thereof. The urethane prepolymer is the reaction product of a di(or higher)hydroxy functional polyol and an isocyanate. The preferred dihydroxy functional polyol is any of polyoxyethylene glycol and polyoxyethylene polyoxypropylene glycols. Preferably, the methoxypolyoxyethylene monols have a molecular weight of about 350 to about 750, and the polyoxyethylene-polyoxypropylene monols have a molecular weight of about 270 to about 3930.

In yet another aspect, the invention relates to an aqueous emulsion having greatly improved stability. The aqueous emulsion includes emulsifiable polyisocyanate. In one embodiment the emulsifiable polyisocyanate may include an isocyanate, a polyisocyanate derived adduct, and d-limonene. The polyisocyanate derived adduct includes the reaction product of a urethane prepolymer and a capping agent, and is free of residual unreacted —NCO groups. The capping agent may be any of methoxypolyoxyethylene monols, polyoxyethylene-polyoxypropylene monols, and mixtures thereof. The urethane prepolymer is the reaction product of a dihydroxy functional polyol and an isocyanate.

A coating material may be formed by combining together the polyisocyanate or isocyanate emulsion, d-limonene and a suitable polyisocyanate-reactive material. The obtained coating material is a polyisocyanate-derived polymer containing at least some d-limonene therein. Suitable polyisocyanate-reactive materials are well known to those skilled in the art and include, for example, polyols, castor oil, water and combinations thereof. Preferred polyols are polyether polyols. Although the polyisocyanate containing d-limonene can be mixed with any suitable amount of polyisocyanate-reactive material, typically the polyisocyanate containing d-limonene is mixed with the polyisocyanate-reactive material at about a 50:50 ratio, based on weight.

Having summarized the invention, the invention is described in detail below by reference to the detailed description below and the following non-limiting examples.

DETAILED DESCRIPTION OF THE INVENTION

Glossary of Terms and Definitions

1. Carbowax 550 is a methoxypolyoxyethylene monol of the formula $CH_3-(OCH_2CH_2)_n-OH$ where n has an average number of 12. Carbowax 550 is available from Union Carbide Chemicals and Plastics and has a molecular weight of 550.
2. Castor oil is a trifunctional, low molecular weight fatty ester polyol that has a hydroxyl No. of 164 mg-KOH/g, with a specific gravity at 25° C. of 0.96, available from CasChem Chemical.
3. D-limonene has a chemical structure of $C_{10}H_{16}$ (1-Methyl-4-(1-methylenyl)cyclohexene), and is an industrial grade d-limonene available from Florida Chemical Company.
4. Jeffol® 3709 is a polyether polyol with a nominal functionality of 2 and a hydroxy value of 30, available from Huntsman Corp.
5. Ucon 75-H-450 is a polyoxyethylene-polyoxypropylene glycol of the formula $HO-(CH_2CH_3CHO)_m-(CH_2CH_2O)_n-H$ and has 75 weight percent of oxyethylene and 25 weight percent oxypropylene groups. Ucon 75-H-450 is available from Union Carbide Chemicals and plastics and has a molecular weight of 980.
6. Rubinate® M is polymeric methane diphenyl diisocyanate that has an isocyanate value of 31.5% and a functionality of 2.7 from Huntsman Polyurethanes.
7. Rubinate® 44 is 4,4'-diphenylmethane diisocyanate that has a %NCO value of 33.5 and a functionality of 2.0, available from Huntsman Polyurethanes.

8. Rubinate® 9457 is 4,4'-diphenylmethane diisocyanate that has a % NCO value of 15.3 and a functionality of 2.4, available from Huntsman Polyurethanes.
9. Rubinol® R-241 is a polyether polyol triol, with a functionality of 3 and a hydroxy value of 240 mg-KOH/g, available from Huntsman Polyurethanes.
10. Rubinol® F-481 is a polyether polyol diol, with a functionality of 2 and a hydroxy value of 30 mg-KOH/g, available from Huntsman Polyurethanes.
11. 33LV is a catalyst available from Air Products.

All molecular weights, unless otherwise specified, are number average.

Materials

Isocyanates

Suitable isocyanates which may be employed include known aliphatic, cycloaliphatic, aromatic and heterocyclic polyisocyanates. Also suitable are polyisocyanates which contain carbodiimide groups, urethane groups, allophanate groups, isocyanurate groups, biuret groups, and urea groups.

Examples of aromatic isocyanates which may be employed include but are not limited to 1,3-phenylene diisocyanate, 1,4-phenylene diisocyanate, 2,4-toluene diisocyanate (TDI), 2,6-toluene diisocyanate, diphenyl methane-2,4'-diisocyanate(2,4'MDI), diphenyl methane-4,4'-diisocyanate (4,4'MDI), naphthalene-1,5-diisocyanate, triphenyl methane-4,4',4"-triisocyanate, polymethylene polyphenylene polyisocyanates and mixtures thereof.

Examples of aliphatic polyisocyanates which may be employed include but are not limited to 2,4-hexahydrotoluene diisocyanate, 2,6-hexahydrotoluene diisocyanate, ethylene diisocyanate, 1,4-tetramethylene diisocyanate, 1,6-hexamethylene diisocyanate (HDI), 2,4,4-tri-methyl-1,6-hexamethylene diisocyanate, and 1,12-dodecane diisocyanate.

Examples of cycloaliphatic polyisocyanates which may be employed include but are not limited to cyclohexane-1,4-diisocyanate, cyclobutane-1,3-diisocyanate, cyclohexane-1,3-diisocyanate, 1-isocyanato-2-isocyanatomethyl cyclopentane, 1-isocyanato-3,3,5-trimethyl-5-isocyanatomethyl cyclohexane (isophorone diisocyanate or IPDI), 2,4'-dicyclohexylmethane diisocyanate, 4,4'-dicyclohexylmethane diisocyanate.

Preferred isocyanates include ethylene diisocyanate, 1,4-tetramethylene diisocyanate, 1,6-hexamethylene diisocyanate (HDI), 2,4,4-tri-methyl-1,6-hexamethylene diisocyanate, 1,12-dodecane diisocyanate, cyclobutane-1,3-diisocyanate, cyclohexane-1,3-diisocyanate, cyclohexane-1,4-diisocyanate, 1-isocyanato-2-isocyanatomethyl cyclopentane, 1-isocyanato-3,3,5-trimethyl-5-isocyanatomethyl cyclohexane (isophorone diisocyanate or IPDI), 2,4-hexahydrotoluene diisocyanate, 2,6-hexahydrotoluene diisocyanate, 2,4'-dicyclohexylhexylmethane diisocyanate, 4,4'-dicyclohexylmethane diisocyanate, 1,3-phenylene diisocyanate, 1,4-phenylene diisocyanate, 2,4-toluene diisocyanate (TDI), 2,6-toluene diisocyanate, diphenyl methane-2,4'-diisocyanate, diphenyl methane-4,4'-diisocyanate (MDI), naphthalene-1,5-diisocyanate, triphenyl methane-4,4', 4"-triisocyanate, polymethylene polyphenylene polyisocyanates and mixtures thereof. A particularly preferred polyisocyanate for making polyisocyanate derived adducts is 4,4' diphenyl methane diisocyanate (4,4'MDI).

Hydroxy Functional Monols and Polyols

Hydroxy functional monols and polyols which may be employed include mono-hydroxy functional polyoxyethylene monols, dihydroxy functional polyoxyethylene glycols, mono-hydroxyfunctional polyoxyethylene-polyoxypropylene monol, and dihydroxy functional EO/PO glycols. Preferably, the mono-hydroxy functional polyoxyethylene monol and the monohydroxy functional EO/PO monols are those available under the tradenames Carbowax MPEG and UCON, respectively, from Union Carbide.

Carbowax MPEG mono-hydroxy functional polyoxyethylene monols have an all ethylene oxide (EO) backbone and a molecular weight of about 100 to about 5000. The Carbowax MPEGs used in the invention preferably have a molecular weight of from about 300 to about 800. The Ucon monohydroxy functional EO/PO glycols have a molecular weight of from about 270 to about 3930.

The dihydroxy functional polyoxyethylene glycols and the dihydroxy functional EO/PO glycols preferably are those available under the tradenames Carbowax PEG and Ucon, respectively, from Union Carbide. The Carbowax dihydroxy polyoxyethylene glycols employed in the invention have a molecular weight of about 500 to about 2500, preferably about 600 to about 800. The Ucon dihydroxy functional EO/PO glycols employed in the invention have a molecular weight of about 500 to about 5000, preferably about 980 to about 2500.

Preparation of Polyisocyanate Derived Adducts

When used, the polyisocyanate derived adducts can be prepared by conventional polymerization techniques, either single-step by combining all of the ingredients, or multi-step. One or more of the aforementioned polyols are reacted with isocyanate to produce an adduct. The adduct can be made according to two different embodiments. The number average molecular weight of the polyisocyanate derived adducts of the invention are from about 600 to about 11000 as determined by gel permeation chromatography. The adducts are free of isocyanate groups.

The first embodiment entails a single step procedure wherein a mono-hydroxy functional monol is reacted with a polyisocyanate to produce the adduct. The total amount of monol added is a stoichiometric equivalent or more with respect to the polyisocyanate. Preferably, the monols are Carbowax MPEG. The amount of monol added is sufficient to consume about 99%, preferably 100% of the isocyanate functionality so as to not leave any isocyanate reactive functionality in the resulting polyisocyanate derived adduct.

The alcohol(s) are added at a controlled rate to the polyisocyanate in order to maintain the reaction temperature between about 50° C. to about 100° C., preferably about 70° C. to about 80° C., most preferably below about 85° C. The total amount of monol added to the polyisocyanate is from about 0.95 of an equivalent per equivalent of polyisocyanate, preferably from about 0.99 to 1.03 of monol to polyisocyanate equivalent.

The reaction is monitored by isocyanate absorbance band by using a Fourier transform infrared spectrometer and isocyanate titration. The reaction end point is achieved when no isocyanate functionality remains in the resulting polyisocyanate derived adduct.

A second embodiment for manufacture of the polyisocyanate derived adducts entails a two step procedure. Step one entails reacting a di-(or higher)hydroxy functional polyol with polyisocyanate to make a polyisocyanate terminated intermediate at a reaction temperature of about 70° C. to about 80° C. The amount of di-hydroxy functional polyol reacted with the polyisocyanate is less than one stoichiometric equivalent with respect to the polyisocyanate. The amount of polyol reacted with the polyisocyanate is preferably not less than about 0.85 of an equivalent per equivalent of isocyanate, more preferably from about 0.90 to 0.97 of polyol to isocyanate equivalent. In step two, a monohydroxy functional alcohol is reacted with the polyisocyanate terminated intermediate made in the first step. The amount of mono-hydroxy functional monol employed is sufficient to consume about 99%, preferably 100% of the isocyanate functionality without leaving any of the remaining isocyanate reactive functionality in the resulting polyisocyanate derived adduct.

Reaction of the mono-hydroxy functional monol with the isocyanate terminated intermediate is monitored by isocyanate absorbance band by using a Fourier transform infrared spectrometer and isocyanate titration. The reaction end point is achieved when no isocyanate functionality remains in the resulting polyisocyanate derived adduct.

Although, in principle, it is intended that all of the isocyanate functionality of the polyisocyanate be reacted, it should be understood that 100 percent complete reaction cannot always be attained, and therefore, trace amounts of unreacted isocyanate and/or unreacted hydroxyls can be expected. Alternatively, reacting "all" of the isocyanate for the purposes of the present invention may be defined as at least 99 percent complete reaction, preferably 100 percent.

The polyisocyanate derived adducts, through selection of the mono-hydroxy functional monol as taught herein below, can be tailored to have a desired hydrophilicity. Generally, these adducts are about 30%, preferably about 40%, most preferably about 100 percent soluble in water at room temperature.

The mono-hydroxy functional monol can be mono-hydroxy functional polyoxyethylene monol or mono-hydroxy functional polyoxyethylene/polyoxypropylene monol.

Preparation of Emulsifiable Polyisocyanates from the Polyisocyanate Derived Adducts Although any emulsifiable polyisocyanate may be useful, preferred emulsifiable polyisocyanates are prepared by blending and agitation of a polyisocyanate and a polyisocyanate derived adduct until a homogeneous solution of the polyisocyanate derived adduct in the isocyanate is attained. The solution of polyisocyanate derived adduct in isocyanate may have about 1 to about 25 percent by weight of the polyisocyanate derived adduct, preferably about 1 to about 15 percent, most preferably about 2 to about 10 percent, based on the combined weight of the adduct and free isocyanate, remainder polyisocyanate.

Preparation of Emulsions of Emulsifiable Polyisocyanates

Emulsions of emulsifiable polyisocyanates are prepared by blending the emulsifiable polyisocyanate with a suitable polyisocyanate-reactive material, such as a polyol, castor oil, water and mixtures thereof. Although any suitable emulsifiable polyisocyanate to reactive material ratio may be acceptable, preferably the emulsifiable polyisocyanate is mixed with the reactive material at a 1:1 ratio by weight under vigorous agitation until the isocyanate is visibly completely emulsified, as indicated by a uniformly cloudy liquid.

Preparation of Coating Compositions Containing d-limonene

The coating material may be prepared by simply hand mixing together a suitable polyisocyanate with at least some d-limonene. Any suitable method may be used to combine the polyisocyanate and d-limonene. Moreover, the d-limonene may be combined with a suitable polyisocyanate-reactive material instead of being combined with the polyisocyanate. Further, d-limonene may be combined with both the polyisocyanate and the polyisocyanate-reactive component. D-limonene should be supplied in an effective amount to reduce the bubbling in the subsequently applied coating material. In this regard, any suitable amount of d-limonene may be used. In an aspect of the invention the coating material includes from about 1% to about 20% d-limonene, based on the total weight of all components in the coating composition. In another aspect, the coating material includes from about 3% to about 20% d-limonene, based on the total weight of all components in the coating composition.

As stated above, any suitable polyisocyanate may be used. In an aspect of the invention to produce the coating material, the polyisocyanate, or the emulsifiable polyisocyanate, or the emulsifiable polyisocyanate from polyisocyanate derived adducts (or any combination thereof) is combined with an effective amount of d-limonene to result in a coating material having reduced bubbling. The polyisocyanate and d-limonene may then be combined with a suitable polyisocyanate-reactive material. For example, the polyisocyanate and d-limonene may be combined with polyol, castor oil, water and combinations thereof.

Generally, the polyisocyanate component and the d-limonene may be blended together under high shear mixing until a homogeneous mixture is obtained. However, any suitable method may be used for combining the polyisocyanate and d-limonene. Moreover, the polyisocyanate-reactive material is combined with the polyisocyanate and d-limonene in any suitable manner, but high shear mixing may be preferred until a homogeneous mixture is obtained.

After combining the above materials, the coating material may be applied to a suitable surface and allowed to cure, to form a polyisocyanate-derived polymer containing d-limonene therein. Although the coating material may be applied to many substrates, it is particularly suitable as a coating material for concrete.

EXAMPLES

The invention is further illustrated by, but is not intended to be limited to, the following examples. All parts and percentages are by weight unless otherwise specified.

Example 1

Formation of Emulsifiable Polyisocyanate

A quantity of Ucon 75H450, a round-bottom flask and a stir blade are each preheated to 60° C. for further use. 33.77 g of Rubinate® 44 is placed into the preheated, round-bottom flask equipped with stir blade, stir bearing, stir shaft, nitrogen inlet, thermocouple, temperature controller, heating mantle, and a stopper, and is heated to 60° C. 66.23 g of the preheated Ucon 75H450, i.e. 0.5 equivalent per equivalent of isocyanate, at a temperature of 60° C. is placed into the addition funnel and added into the preheated flask with 33.77 g of Rubinate® 44 at a temperature of 60° C. over 1 hour. The reaction temperature is increased from 60° C. to 75° C. over 60 minutes and the mixture is allowed to react for 6–8 hours to produce an —NCO terminated adduct. The end of the reaction is adjudged to occur when the %NCO content of the resulting isocyanate terminated intermediate is between 5.53–5.67% as determined by NCO titration.

74.25 g Carbowax MPEG550 at a temperature of 60° C. is quickly added into the flask to react with the above formed isocyanate terminated intermediate for 4 hours at 75° C. to produce a polyisocyanate derived adduct. The reaction end is identified by infrared analysis which shows no evidence of isocyanate. The above-formed polyisocyanate derived adduct has a number average molecular weight of 2580 as determined by gel-permeation chromatography and a viscosity of 3050 centipoise at 50° C. as determined by using Brookfield viscometer. The structure of the polyisocyanate derived adduct is Carbowax MPEG550 capped isocyanate terminated intermediate based on Ucon 75H450 and Rubinate® 44.

An emulsifiable polyisocyanate is formed by blending the above-formed polyisocyanate derived adduct at a temperature of 50° C. with Rubinate® M at a temperature of 50° C. at 5/95 ratio by weight until a homogeneous solution is reached after cooling to room temperature.

Addition of d-limonene.

D-limonene was added to the above emulsifiable polyisocyanate in a polyisocyanate/d-limonene weight ratio of about 80/20. The d-limonene was added to the emulsifiable polyisocyanate and blended by hand utilizing a tongue depressor. Mixing was continued for about 2 minutes until a homogeneous mixture was observed. The mixture was set aside for further use.

Reactive component preparation.

Three reactive components were prepared. Component 1 was a 50/50 weight ratio blend of castor oil and Rubinol R-241; Component 2 was a 50/50 weight ratio blend of castor oil and Rubinol F-481; and Component 3 was a 50/50 weight ratio blend of Rubinol R-241 and Rubinol F-481. Each of the reactive components were prepared by blending with a high shear blade mixer for at least about five minutes until a homogeneous mixture was obtained.

Emulsified polyisocyanate coating composition preparation.

Three emulsified polyisocyanate coating compositions were prepared. Each coating composition was prepared by blending the emulsifiable polyisocyanate with one of the three reactive Components at a 50/50 weight ratio. The coating compositions were prepared by blending the emulsifiable polyisocyanate with the reactive Component by hand using a tongue depressor for at least about 2 minutes at room temperature.

Application of coating compositions to concrete surfaces.

Concrete blocks were obtained. The blocks were sandblasted and marred with bug holes. The bug holes were made by chipping into the concrete with masonry nails and then enlarging the holes by sandblasting. The average bug hole measured approximately ¼ inch deep and ½ inch wide. Thereafter, the blocks were immersed in tap water and left to soak overnight.

After soaking overnight, the blocks were removed from the water and standing water was removed from the bug holes utilizing paper towels.

Each of the coating compositions prepared above were then applied to a surface of a concrete block utilizing a film applicator knife available from P. N. Gardner. The film thickness was controlled to a thickness of about 5 mils. This application of coating compositions resulted in thin films over the concrete surfaces which filled the bug holes. The coatings were left to cure on the concrete blocks overnight at ambient conditions.

Each of the three cured coatings were visually inspected the next day and it was observed that the coatings were free from bubbling.

Example 2

This example illustrates the formation of a coating composition according to the invention wherein a non-emulsifiable polyisocyanate is used. All weights are based on total weight percent of all components used to form the coating composition.

Preparation of Isocyanate Component.

About 7.27% by weight Rubinate® 9457, about 9.08 weight percent d-limonene, and about 29.06 weight percent Rubinate® M were added to a high shear mixer and subjected to high shear mixing for about 10 minutes until a homogeneous mixture was obtained.

Reactive Component Preparation.

About 27.25 weight percent castor oil, about 5.45 weight percent 1,4-butanediol, about 0.09 weight percent 33LV catalyst and about 21.80 weight percent Jeffol® 3709 were added to a high shear mixer and mixed under high shear for about 10 minutes until a homogeneous mixture was obtained.

Preparation of Coating Composition.

The isocyanate component and the reactive component were combined and mixed under high shear for about 5 minutes until a homogeneous mixture was obtained.

Application of Coating Composition to Concrete Surface.

A small amount of the coating composition was applied onto a clean glass plate with a film applicator knife available from P. N. Gardner and drawn down to an about 40 mil thick film. The film was allowed to cure and resulted in an essentially completely bubble free coating over the glass plate.

Comparative Example

A comparative coating mixture was prepared essentially as in Example 2 with the exception that no d-limonene was added to the coating mixture. This coating mixture was applied to a clean glass plate and drawn down to an about 40 mil thickness and allowed to cure. The resulting coating had bubbles throughout.

What is claimed:

1. A polyisocyanate-derived polymer containing from about 1% to about 20% d-limonene based on the total weight of all the components in the polyisocyanate-derived polymer, wherein the d-limonene reduces the foaming of the polyisocyanate-derived polymer when it is applied to a surface.

2. A coating material formed by combining materials comprising:
    a) polyisocyanate;
    b) from about 1% to about 20% d-limonene based on the total weight of all the materials in the coating material; and
    c) polyisocyanate-reactive material,
wherein, the d-limonene reduces the foaming of the coating material when it is applied to a surface.

3. The coating material of claim 2, wherein the polyisocyanate-reactive material is selected from the group consisting of polyols, castor oil, water, and combinations thereof.

4. The coating material of claim 3, wherein the polyol is polyether polyol.

5. The coating material of claim 2, wherein the polyisocyante is emulsifiable.

6. The coating material of claim 5, wherein the polyisocyanate is an aqueous emulsion.

7. The coating material of claim 2, wherein the polyisocyanate is selected from aliphatic polyisocyanates, cycloaliphatic polyisocyanates, aromatic polyisocyanates, heterocyclic polyisocyanates, and combinations thereof.

8. The coating material of claim 7, wherein the aromatic polyisocyanates are selected from the group consisting of 1,3-phenylene diisocyanate, 1,4-phenylene diisocyanate, 2,4-toluene diisocyanate, 2,6-toluene diisocyanate, diphenyl methane-2,4'-diisocyanate, diphenly methane-4,4'-diisocyanate, naphthalene-1,5-diisocyanate, triphenyl methane-4,4',4"-triisocyanate, polymethylene polyphenylene polyisocyanates, and mixtures thereof.

9. The coating material of claim 8, wherein the aromatic polyisocyanate is polymethylene polyphenylene polyisocyanate.

10. A concrete surface having thereon a coating formed by combining materials comprising polyisocyanate, d-limonene, and polyisocyanate-reactive material.

11. The concrete surface of claim 10, wherein the d-limonene is present in an effective amount to reduce bubbling of the coating material when compared to a similar coating material which does not include d-limonene.

12. The concrete surface of claim 11, wherein the d-limonene is present in an amount of from about 1 weight percent to about 20 weight percent, based on the total weight of the coating material.

13. The concrete surface of claim 12, wherein the d-limonene is present in an amount of from about 3 weight percent to about 20 weight percent, based on the total weight of the coating material.

14. A concrete surface having thereon a coating comprising a polyisocyanate-derived polymer containing d-limonene.

* * * * *